United States Patent [19]

Raj et al.

[11] Patent Number: 4,927,164
[45] Date of Patent: May 22, 1990

[54] FERROFLUID SEAL WITH EPOXY POLE PIECES

[75] Inventors: Kuldip Raj, Merrimack, N.H.; Joseph Moses, Tyngsboro, Mass.; Ronald Moskowitz, Hollis; Frank Bloom, Windham, both of N.H.

[73] Assignee: Ferrofluidics Corporation, Nashua, N.H.

[21] Appl. No.: 229,640

[22] Filed: Aug. 8, 1988

[51] Int. Cl.$^5$ ............................................... F16J 15/40
[52] U.S. Cl. ....................................... 277/80; 277/135
[58] Field of Search ............... 277/80, 135, 1, DIG. 6, 277/235 R, 235 A; 428/692, 693, 418, DIG. 900, 454, 469; 252/62.54, 62.57; 427/386

[56] References Cited

U.S. PATENT DOCUMENTS

| | | | |
|---|---|---|---|
| 3,740,060 | 6/1973 | Miskolczy et al. | 277/80 |
| 4,357,021 | 11/1982 | Raj et al. | 277/80 |
| 4,357,023 | 11/1982 | Yamamura | 277/80 |
| 4,407,508 | 10/1983 | Raj et al. | 277/80 |
| 4,445,696 | 5/1984 | Raj et al. | 277/80 |
| 4,762,865 | 8/1988 | Gold | 252/62.59 |

FOREIGN PATENT DOCUMENTS

| | | | |
|---|---|---|---|
| 0220834 | 5/1987 | European Pat. Off. | 277/80 |
| 60-91066 | 5/1985 | Japan | 277/80 |
| 796595 | 1/1981 | U.S.S.R. | 277/80 |
| 1020674 | 5/1983 | U.S.S.R. | 277/135 |
| 2146079A | 3/1985 | United Kingdom | 277/80 |

Primary Examiner—Allan N. Shoap
Assistant Examiner—Jeffrey J. Hohenshell
Attorney, Agent, or Firm—Wolf, Greenfield & Sacks

[57] ABSTRACT

In a ferrofluid seal which comprises a magnet and at least one pole piece, the pole piece is fabricated from a ferromagnetic material which directly bonds to the magnet face. Since the pole piece material directly bonds to the magnet, no additional adhesive is necessary. Thus, the conventional steps of applying an adhesive and mounting pole pieces on the magnet are eliminated. In addition, voids and bubbles in the adhesive are eliminated, thus, enhancing seal integrity.

In one embodiment, the ferromagnetic material is a ferromagnetic epoxy compound comprising a mixture of conventional epoxy materials plus a fine powder of ferromagnetic material such as iron, cobalt, nickel or various metal alloys.

15 Claims, 4 Drawing Sheets

FERROFLUID SEAL WITH EPOXY POLE PIECES

FIELD OF THE INVENTION

This invention relates to ferrofluid seals comprised of a magnet and one or more pole-pieces.

BACKGROUND OF THE INVENTION

In many applications it is desirable to use exclusionary bearing or shaft seals to isolate a bearing from the environment or to isolate a closed area from the general environment. One well-known type of exclusion seal is the ferrofluid seal.

A conventional ferrofluid seal is comprised of a precisely dimensioned ring-shaped permanent magnet, ring-shaped pole pieces, and ferrofluid. The magnet is positioned around the shaft or bearing and the pole pieces are mechanically attached to the magnet faces and extend close to, but not touching, the shaft or bearing to form one or more gaps. The gaps are filled with ferrofluid.

The pole pieces are conventionally formed from a magnetically permeable metal and the ferrofluid is comprised of a suspension of magnetically permeable particles in a fluid carrier so that the pole pieces, the magnet, the ferrofluid and the shaft or bearing form a closed-loop magnetic circuit. The magnetic flux generated by the magnet passes through the ferrofluid and holds it in the gaps between the pole pieces and the shaft to form the seal. The construction and operation of such seals are described in detail in U.S. Pat. Nos. 4,407,508; 4,694,213; 4,630,943; 3,848,879; 4,628,384; 4,357,022 and 4,357,021 and will not be discussed further herein.

The current technique of manufacturing such ferrofluid seals generally involves several processing steps. First, the ring-shaped magnet is inserted into an assembly tool which holds the magnet. A bead of fast-curing adhesive (such as a cyanoacrylic adhesive) is then spread on one of the magnet faces. Finally, a metal pole piece is pressed against the magnet face into the adhesive to attach the pole piece to the magnet. In seal configurations in which pole pieces are attached to both magnet faces, the completed magnet and pole piece assembly is inverted and the above process is repeated.

As is obvious from the above-mentioned assembly steps, in the conventional construction, the metal pole piece is not an integral part of the magnet. Consequently, the integrity of the interface between the magnet and the pole piece depends on the integrity of the bond between the adhesive and the magnet and pole pieces. Due to bubbles and voids, the adhesive may have gaps which allow leaks in the magnet-pole piece interface and which, in turn, allow the entire seal to leak.

The conventional assembly technique is slow and expensive since several manufacturing steps are employed and time is required for the adhesive to cure at each step. Further it is difficult to manufacture seals with pole pieces that have non-planar geometries without machining the completed assembly. This machining is expensive and requires additional assembly time and steps. In addition, it is difficult to assemble seals which have very thin (less than 0.005 inch) pole pieces because dimensional tolerances cannot be maintained due to the variable thickness of the adhesive layer and due to distortion caused by handling.

Accordingly, it is an object of the present invention to provide a ferrofluid seal which can be constructed and inspected simply and with less steps than conventional ferrofluid seals thereby reducing cost.

It is another object of the present invention to provide a ferrofluid seal which is less prone to leakage than conventional ferrofluid seals.

It is yet a further object of the invention to provide a ferrofluid seal in which the pole pieces are formed of a material which directly bonds to the magnet without the use of any additional adhesive, thereby preventing leakage along the adhesive interface.

It is still another object of the present invention to provide a ferrofluid seal in which conventional metallic pole pieces are eliminated.

It is a further object of the present invention to provide a ferrofluid seal in which the pole pieces are formed of a ferromagnetic epoxy material which directly bonds to the magnet face.

It is another object of the invention to provide a ferrofluid seal in which intricate pole piece geometries can be constructed without substantial increase in the cost of the seal.

It is yet another object of the invention to provide a ferrofluid seal in which the magnetic field gradients in the seal can be conveniently controlled (through the shape of pole pieces thereby minimizing ferrofluid separation and changes in seal pressure capacity with time.

It is still another object of the present invention to provide a ferrofluid seal in which the overall dimensional and tolerance control is superior due to trimming of the completed assembly.

It is yet a further object of the present invention to provide a ferrofluid seal in which any pole piece width may be achieved (such as very thin pole pieces) without distorting the part. Thus, seals with a very thin overall width can be produced.

It is yet another object of the present invention to provide a ferrofluid seal with epoxy pole pieces in which the pole pieces are electrically conducting. Thus the seals can be used with an electrically conducting ferrofluid to conduct electrical charges from a rotating member to a fixed member.

SUMMARY OF THE INVENTION

The foregoing objects are achieved and the foregoing problems are solved in one illustrative embodiment of the invention in which a ferromagnetic material which directly bonds to the magnet faces is used to form pole pieces. Since the ferromagnetic material directly bonds to the magnet no additional adhesive is necessary. Thus, the conventional steps of applying an adhesive and mounting the metal pole pieces are eliminated. In addition, voids and bubbles in the adhesive are eliminated thus enhancing seal integrity.

Since the epoxy is initially in a liquid state while the seal is being assembled, it can easily be molded into an appropriate shapes and trimmed while still fluid without requiring machining of the completed seal to achieve necessary tolerances or shapes.

More particularly, in accordance with one embodiment, a ferromagnetic epoxy compound is used to construct the pole pieces. Ferromagnetic epoxy is a mixture of a conventional epoxy compound and a fine powder of a ferromagnetic material such as iron, cobalt, nickel or various alloys involving transition and rare-earth metals as well as amorphous materials. The resulting compound is magnetically permeable, but will easily bond to the magnet face. The cured compound forms a rigid pole piece. With the proper choice of additive, the epoxy can be made electrically conducting so that the seal can be used in those applications where an electrically-conductive ferrofluid is appropriate.

DETAILED DESCRIPTION OF THE PREFERRED EMBODIMENT

Figure 1:
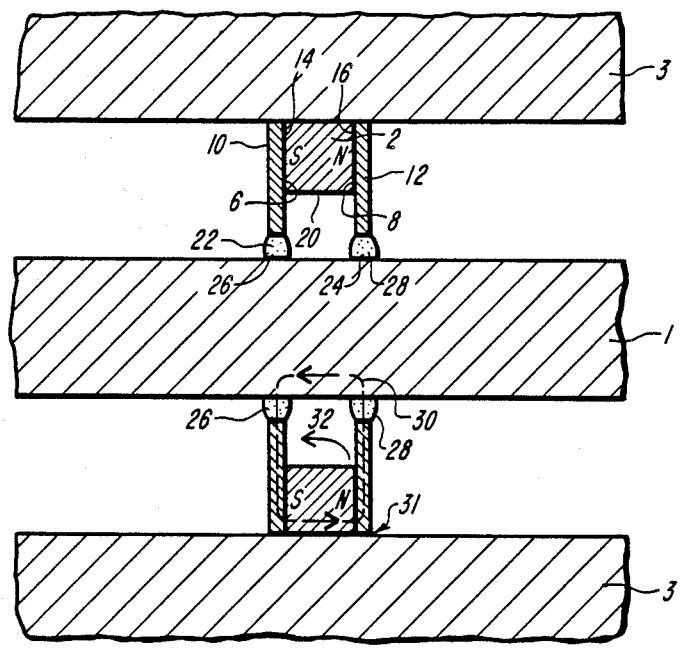
FIG. 1 is a cross-section of a conventional ferrofluid seal construction.

FIG. 1 shows a conventional ferrofluid exclusion seal used to seal a rotary shaft. Such a seal may, for instance, be used to seal a drive shaft 1 on a computer disk drive (not shown).

The seal consists of an axially-polarized ring shaped magnet 2 which is positioned over shaft 1 as shown. The outer diameter of magnet 2 is hermetically sealed to non-magnetically permeable housing 3 in a conventional fashion by adhesives or O-rings (not shown).

Magnet 2 has two faces, 6 and 8, to which pole pieces 10 and 12 are respectively attached. In particular, pole piece 10 is attached to magnet face 6 by a layer of adhesive 14 and pole piece 12 is attached to magnet face 8 by adhesive layer 16.

In the particular seal design shown in FIG. 1, the inner surfaces of pole pieces 8 and 10 extend past the inner surface 20 of magnet 2, but in other designs pole pieces 8 and 10 may terminate flush with inner surface 20. The inner surfaces of pole pieces 8 and 10 form two gaps 22 and 24 with shaft 1 which gaps are filled with ferrofluid beads 26 and 28 which complete the seal.

Shaft 1, magnet 2, pole pieces 8 and 10 and ferrofluid beads 26 and 28 form a closed loop magnetic circuit shown as dotted line 30. The magnetic flux in the circuit which appears at gaps 22 and 24 holds the ferrofluid in beads 26 and 28 in place.

One problem with the seal construction shown in FIG. 1 is that voids in either of adhesive layers 14 or 16 can compromise the integrity of the seal by allowing interchange of fluids past the seal beads(shown schematically as arrows 31 and 32). In the case of double seals such as that shown in FIG. 1, failure of one of adhesive layers 14 and 16 will not cause complete seal failure, but may still greatly reduce the pressure capacity of the seal by bypassing one ferrofluid bead.

Figure 2:
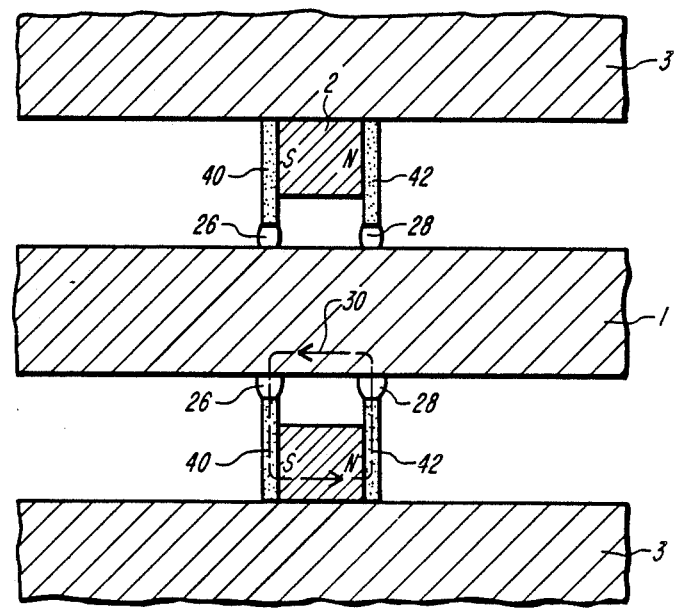
FIG. 2 is a cross-section of a ferrofluid seal constructed in accordance with one embodiment of the invention.

FIG. 2 shows a ferrofluid seal constructed in accordance with the invention. Elements which are equivalent to those shown in FIG. 1 are designated with equivalent numerals. The inventive seal differs from the conventional seal in that metal pole pieces 8 and 10 in the conventional seal have been replaced with epoxy pole pieces 40 and 42 and adhesive layers 14 and 16 have been eliminated because the epoxy bonds directly to magnet faces 6 and 8. Because the epoxy pole pieces are magnetically permeable, the inventive seal operates in the same fashion as the conventional seal.

The epoxy compound used to fabricate pole pieces 40 and 42 is made by mixing a powdered ferromagnetic material with a conventional epoxy compound. Epoxies are considered well-suited for the seal embodiments of the present invention because of their environmental durability and compatibility with ferrofluids.

The epoxy which is selected should not set quickly and, preferably, should have a low viscosity so that it is possible to easily add ferromagnetic powder into the epoxy and mix the components Epoxy materials which meet such requirements and are therefore suitable for use with the illustrative embodiment are available from a number of manufacturers. For example suitable two part epoxy materials include Eccobond 55-Catalyst 9 system available from Emerson Cumming Corporation, a Division of A. R. Grace Co. Canton, Mass.; Devcon Clear 2-Ton Epoxy available from Devcon Corporation, Canton, Mass.; MasterBond EP30 or EP30-1 available from Masterbond, Inc., Hackensack, N.J.; MVP 33 available from Devcon Corporation, Canton, Mass. and Scotch Weld 2216 B/A available from 3M Company, St. Paul, Minn. Other commercial compounds may be suitable and the foregoing list is not intended to be exclusive.

The epoxy mixture can be prepared by following manufacturer's instuctions. Generally, the epoxy consists of two parts: a resin and a hardener or catalyst. The ferromagnetic powder is first throughly mixed with the resin and then the hardener is added with further mixing until the whole mixture is uniform and has a smooth consistency. The cure time for such an epoxy should be sufficiently long, typically ½ hour or longer to allow time for ferromagnetic powder to be properly mixed. The epoxy cure time after the mixing may be accelerated either by application of ultraviolet light or by application of heat in accordance with the manufacturer's instructions.

There are numerous magnetic metals or alloys that are suitable for the ferromagnetic powder used in the epoxy compound. However, magnetic materials with a high saturation magnetization value are of special interest because they enhance the magnetic flux which can be generated in the seal gaps. An example of some ferromagnetic substances which are suitable for use with the illustrative embodiment together with corresponding saturation magnetization values are:

TABLE 1

| Substance | Magnetization Saturation (in Gauss) |
| --- | --- |
| Iron-Cobalt Alloy (50% Fe, 50% Co) | 24,500 |
| Iron (Fe) | 21,000 |
| Iron-Silicon Alloy (97% Fe, 3% Si) | 20,000 |
| Cobalt (Co): | 17,900 |
| Iron-Nickel Alloy (55% Fe, 45% Ni) | 16,000 |
| Iron-Nickel-Molybdenum (16 Fe,79 Ni,4 Mo) | 8,700 |
| Nickel (Ni): | 6.100 |
| Iron Oxide ($Fe_3O_4$) | 6,000 |

Since the saturation magnetization value of iron (Fe) is close to the higher value and since iron is commercially available at reasonable prices, it is preferred for the illustrative embodiment. Accordingly, the embodiments discussed herein discuss the use of iron powder as the ferromagnetic material. However, any of the other substances listed in the table as well as other ferromagnetic substances may be used. Such ferromagnetic materials and their properties are well-known and discussed in many textbooks concerning ferromagnetic materials such as *Ferromagnetic Materials—A Handbook on the Properties of Magnetically Ordered Substances*, Vol., I, II and III edited by E. P. Wolhfarth; *Ferromagnetism* by Richard M. Bozorth and *Physics of Magnetism* by Soshim Chikazumi, which references are incorporated herein by reference.

MANUFACTURE OF EPOXY COMPOUND POLE PIECE SEALS

The uncured ferromagnetic/epoxy compound is uniformally spread on a permanent magnet substrate (which may either be magnetized or unmagnetized) to form a single or double pole ferrofluid seal. The thickness of epoxy compound coating may be as small as 0.005 inches and the magnet thickness may also be small (such as 0.010 inches) thus making it possible to form very thin seals with an overall thickness of 0.015 inches or less. Since the epoxy compound bonds directly to the magnet faces epoxy compound/magnet interface is automatically sealed in a leak-tight manner preventing ferrofluid migration to the seal outer diameter as the epoxy cures. For mass production, the magnet substrate may already be fabricated to a specific thickness in the form of a large sheet, or individual magnets may exist in the form of rings formed in precise dimensions. In either case the fixtures described below are used to hold the magnet and apply the ferromagnetic material/epoxy compound.

Figure 3A:
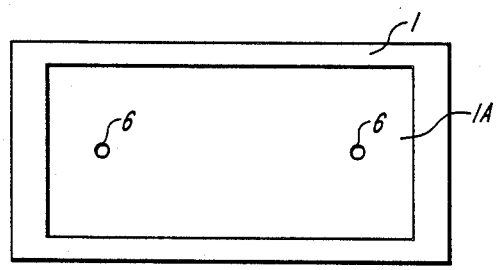
FIG. 3 shows a cross-sectional view of a manufacturing fixture for manufacturing sheet magnet structures having epoxy pole pieces.
Figure 3B:
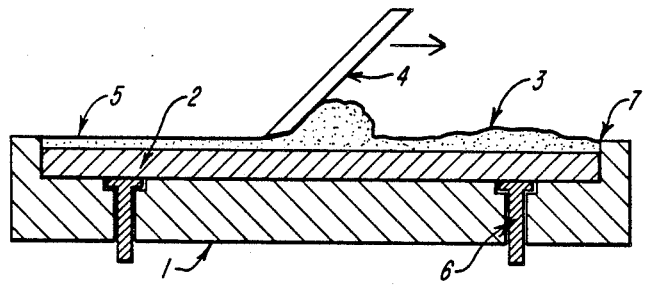

FIG. 3 shows a fixture suitable for preparing a structure consisting of a sheet magnet and pole pieces made from ferromagnetic material/epoxy compounds. The fixture consists of a base plate with a machined recess which received the magnet substrate and epoxy compound. During assembly, fixture 1 would first be coated with a thin film of mold release agent 7. A mold release agent suitable for the illustrative embodiment would be "Slide" Epoxease mold release compound manufactured by Percy Hanns Corp., Skokie, Ill. Next a permanent magnet substrate material 2 would be placed in fixture 1. A heavy coating of ferromagnetic material/epoxy compound 3 would be applied over magnet substrate 2. The layer of epoxy compound 3 can then be trimmed using a knife edge epoxy draw tool 4 before epoxy 3 cures. During the trimming process excess epoxy would be scraped away leaving magnet substrate 2 uniformly coated with epoxy compound which hardens to form a pole piece. After sufficient curing time ejector pins 6 are pressed up to remove the magnet/pole piece structure from fixture 2. The magnet/pole piece structure can then be machined, stamped or cut into desired shapes and sizes to produce a variety of ferrofluid seals.

Figure 4A:
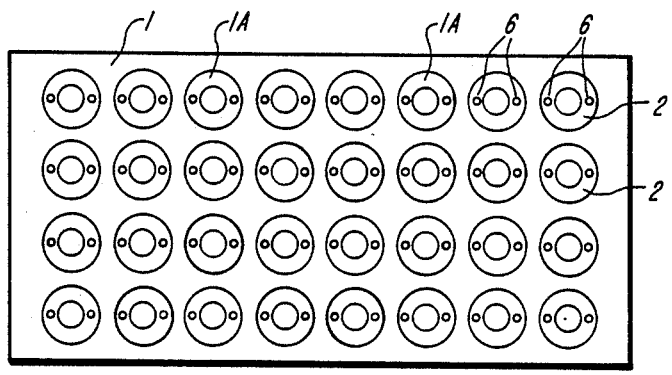
FIG. 4A shows a top view of a manufacturing fixture for manufacturing ring magnet structures having epoxy pole pieces.
Figure 4B:
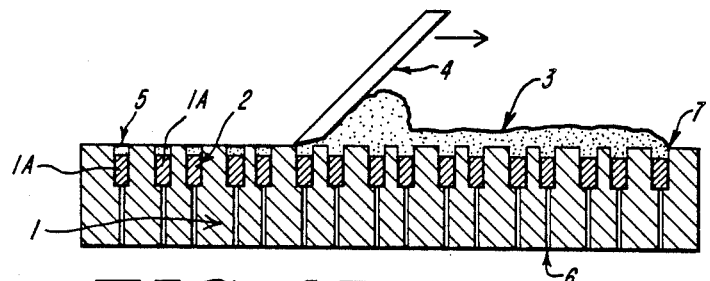
FIG. 4B shows a cross-sectional view of the fixture shown in FIG. 4A for manufacturing ring magnet structures having epoxy pole pieces.

FIGS. 4A and 4B show another fixture suitable for preparing a structure consisting of a ring magnet and a pole piece formed of ferromagnetic/epoxy compound. In use, base plate 1 would first be coated with a thin film of mold release agent 7, such as the "Slide" Epoxease compound mentioned above. Next permanent magnet material 2 would be placed in the fixture. A heavy coating of ferromagnetic/epoxy compound 3 would then be applied over magnet material 2. Using a knife-edge epoxy draw tool 4, excess epoxy compound can be scraped away leaving a uniform epoxy compound coat on magnet material 2.

After sufficient curing time, ejector pins 6 are pressed up thru holes 7 to remove the finished epoxy coated ring magnet. A tumbling process can then be used to remove any rough edges or unwanted material.

ILLUSTRATIVE EPOXY COMPOUND

Samples of epoxy compound were prepared and the physical properties tested. Iron powder was used as the ferromagnetic material. The iron powder was purchased from Fisher Scientific Company, Fairlawn, New Jersey. The following types of iron powders were used: I - 61, I - 62, I - 60 and I - 57. The I - 57 powder was of 40 mesh size and the other samples were of 100 mesh size or higher. It was found that fine iron powders (100 mesh or higher) performed much better in terms of durability and trimming compared with coarse powders such as I - 57.

The Eccobond 55 epoxy mentioned above was selected. Eccobond 55 epoxy resin was mixed with iron powder I - 61 in the weight ratio of 1:3. Small batches of this mixture were prepared in a dish. In order to facilitate the removal of the cured epoxy from the dish, it was precoated with a mold-release agent. After the iron powder particles were thoroughly mixed in, Catalyst 9 was added in the ratio of Eccobond/Catalyst 9 of 100 ml/6 ml (the ratio of the two constituents in the absence of iron powder is 100 ml/12 ml). The epoxy/iron mixture and the catalyst were throughly mixed until a smooth paste was obtained. The epoxy was then placed in a vacuum chamber to remove entrapped air. After all the air was removed, the iron/epoxy mixture was brought back to atmospheric pressure and cured before testing.

The physical properties of Eccobond 55 epoxy with and without iron in the cured state at normal room temperature are listed in TABLE 2.

TABLE 2

| Property | Eccobond 55 | Fe/epoxy mixture |
| --- | --- | --- |
| Density | 1.18 gm/ml | 2.87 gm/ml |
| Magnetization | 0 | 4940 gauss @ 5KOe or 137.5 emu/gm @ 5KOe |
| Electrical resistivity | infinite | $2 \times 10^6$ Ohm-cm |
| Color | off-white | black |

Figure 5:
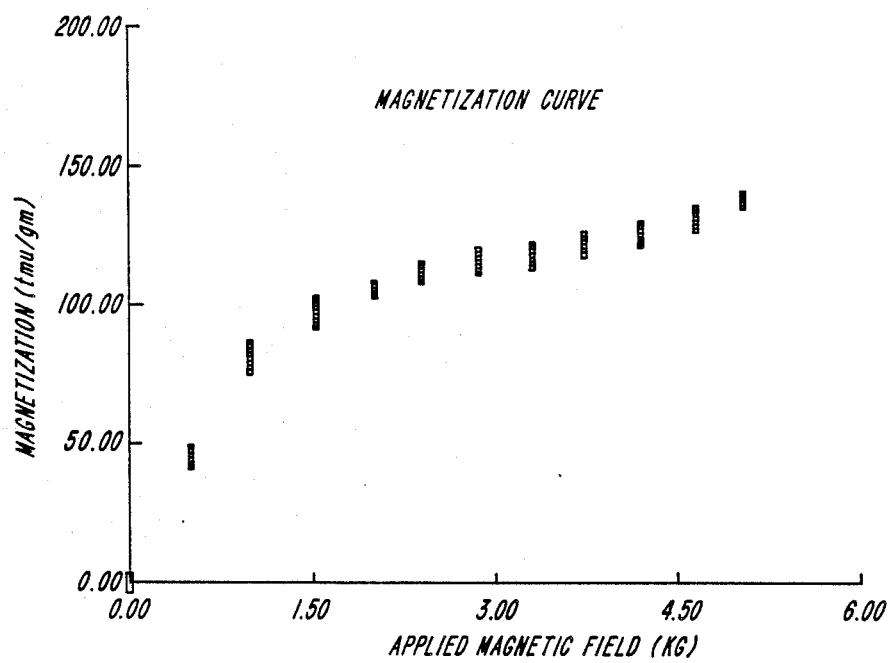
FIG. 5 is a magnetization curve for an illustrative iron/epoxy compound.
Figure 6:
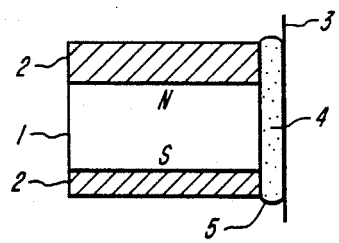
FIG. 6 shows a double pole piece ferrofluid seal with pole pieces constructed of iron/epoxy compound in which two pole pieces are of unequal width.

A magnetization curve for the resulting iron/epoxy material is shown in FIG. 5. Variations in above properties may be achieved depending upon the type and amount of ferromagnetic materials used. For example, reducing the amount of iron in the iron/epoxy compound will result in a compound with lower density and lower magnetization.

As shown in TABLE 2, the iron/epoxy compound is electrically conducting and, consequently, ferrofluid seals having pole pieces made with such a compound may be used for grounding of electrostatic charges when used in conjunction with an electrically conducting ferrofluid. The resistivity of the iron/epoxy compound is about two orders of magnitude lower than a typical electrically-conducting ferrofluid. Consequently, a pole piece made from such a material will only slightly increase the overall seal electrical resistance over a pole piece made of metal.

Since the iron/epoxy compound saturates at a relatively low value of 5000 Gauss, the inherent pressure capacity of a ferrofluid seal made with such material is also small. It has been founs that the pressure capacity is typically in the range of 0.5 PSI (14 in H2O) per stage. Consequently, iron/epoxy compound ferrofluid seals are specially useful in applications where the differential pressure capacity requirements are small such as exclusion seals for computer disk drive spindles, ferrofluid film bearings, motors and actuators. An additional advantage of these seals is that they can be produced with a small axial length.

EXAMPLE 1

A pole piece/magnet structure was made using the fixture illustrated in FIG. 3. Base plate 1 was first coated with a thin film of "Slide" Epoxease mold release agent 7. Next permanent magnet material 2 coated on the top with Devcon MVP Type 33 activator 3 was inserted (coated side up) into base plate 1. An Iron/Devcon epoxy compound was applied over coated magnet surface in a heavy layer. Excess uncured iron epoxy material 5 was then scraped or washed away. The epoxy was then cured to leave the magnet material 2 coated with uniform coating 4 of cured iron/epoxy at thicknesses up to 0.020" thick.

After sufficient curing time, ejector pins 6 were depressed to remove iron/epoxy coated magnet material.

SEAL EMBODIMENTS

Various ferrofluid seal embodiments shown in FIGS. 6–10 were constructed using the iron/Devcon epoxy material. The seal embodiments included single pole, double pole and tapered pole piece types. In all these embodiments the magnet inner surface was flush with the pole piece inner surface and numeral 1 refers to the permanent magnet material magnetized as shown. Numeral 2 refers to the iron/epoxy pole pieces. Numeral 4 refers to the pole piece/ shaft gap. Numeral 3 refers to a magnetically permeable shaft and numeral 5 refers to ferrofluid.

Figure 11:
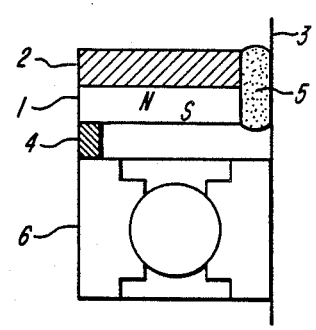
FIG. 11 is the set-up for testing of iron/epoxy pole piece seals.

The seal embodiments were tested using the fixture shown in FIG. 11. Each seal was mounted in the fixture next to a bearing. When mounted in the fixture, the seal magnet (shown schematically as element 1) was separated by a magnetically permeable shim 4 from a magnetically permeable bearing 6. In this arrangement, the magnetic circuit for single pole piece seals was completed through the bearing. In all tests the ferrofluid used was Ferrofluid Type CFF100 commercially available from Ferrofluidics Company, Nashua, N.H. This ferrofluid has a saturation magnetization of 250 Gauss and a viscosity of 130 CPS at 27° C.

Figure 7:
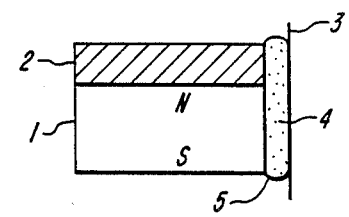
FIG. 7 shows another seal embodiment with a single pole piece constructed from iron/epoxy compound.
Figure 8:
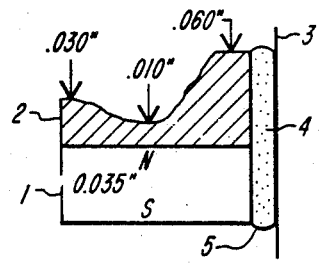
FIG. 8 is a single pole piece ferrofluid seal with the pole piece constructed of iron/epoxy compound in which the pole piece is uneven as might result from imperfect manufacturing.
Figure 9:
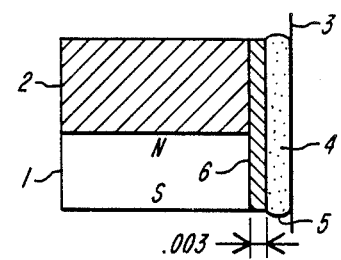
FIG. 9 is a single pole piece ferrofluid seal with the pole piece constructed of iron/epoxy compound in which the iron/epoxy compound used to form the pole piece has migrated over the magnet inner surface as might result from a manufacturing error.

The pressure capacities of seal embodiments shown in FIGS. 7, 8 and 9 are summarized in TABLE 3. The first column (Powder Grade) refers to the powder particle size as discussed above with respect to a sample iron/epoxy material.

TABLE 3

Static Pressure capacities of iron/epoxy single pole seals

| Powder Grade | Magnet width | pole piece width | radial gap | pressure capacity in "H2O |
|---|---|---|---|---|
| FIG. 7 Embodiment | | | | |
| I-61 | 0.030" | 0.010" | 0.0075" | 8 |
| I-61 | 0.030" | 0.010" | 0.006" | 10 |
| I-61 | 0.035" | 0.005" | 0.005" | 6 |
| I-61 | 0.035" | 0.010" | 0.006" | 12 |
| I-61 | 0.020" | 0.020" | 0.006" | 8 |
| I-61 | 0.030" | 0.020" | 0.006" | 10 |
| I-61 | 0.020" | 0.010" | 0.006" | 6 |
| FIG. 8 Embodiment | | | | |
| I-61 | 0.035" | (0.010 to | 0.006" | 12 |
| I-61 | 0.020" | 0.060) | 0.008" | 3 |
| FIG. 9 Embodiment (0.003" iron/epoxy on magnet face) | | | | |
| I-60 | 0.030" | 0.010" | 0.006" | 10 |
| I-62 | 0.030" | 0.010" | 0.006" | 9 |

Figure 10:
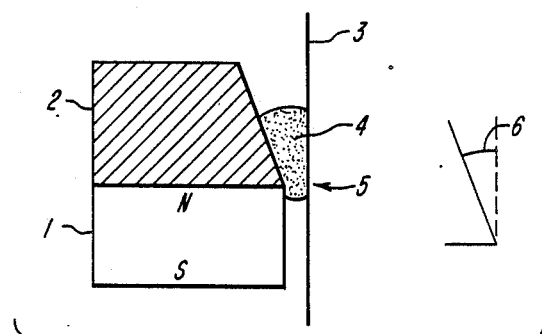
FIG. 10 is a ferrofluid seal with a tapered single pole piece.

The pressure capacities of the seal embodiment shown in FIG. 10 are summarized in TABLE 4.

TABLE 4

Static pressure capacity of tapered single iron/epoxy pole piece seals.

| Powder Grade | Chamfer angle | Pressure capacity in "H2O |
|---|---|---|
| I-61 | 45° | 35 |
| I-62 | 20° | 38 |

Although several embodiments of the illustrative ferromagnetic/epoxy pole piece seals are illustrated, it is within the skill of the art to apply the epoxy compound pole pieces to other conventional seal designs all within the spirit and scope of the invention. For example by the use of suitable molds it is possible to fabricate seals in which the pole pieces extens past the inner magnet surface. These applications are intended to be covered by the following claims.

What is claimed is:

1. In a ferrofluid seal for sealing an object, said seal having a permanent magnet positioned about said object, at least one pole piece attached to said magnet, said pole piece extending near said object to form a gap and ferrofluid in said gap, the improvement wherein said pole piece is fabricated entirely from an adhesive material, which material adhesively bonds directly to said magnet to form a hermetic seal between said pole piece and said magnet.

2. In a ferrofluid seal, the improvement according to claim 1 wherein said pole piece material is magnetically permeable.

3. In a ferrofluid seal, the improvement according to claim 1 wherein said pole piece is comprised of a compound of epoxy resin and a ferromagnetic material.

4. In a ferrofluid seal, the improvement according to claim 3 wherein said ferromagnetic material is chosen from the group consisting of iron, cobalt, nickel, iron-cobalt alloys, iron silicon alloys, iron nickel alloys, iron nickel-molybdenum alloys and iron oxide.

5. In a ferrofluid seal, the improvement according to claim 3 wherein said compound comprises an epoxy resin mixture and powdered ferromagnetic material.

6. In a ferrofluid seal, the improvement according to claim 5 wherein said epoxy resin mixture comprises a mixture of epoxy resin and epoxy resin hardener.

7. In a ferrofluid seal, the improvement according to claim 5 wherein said pole piece is comprised of a material which is electrically conductive.

8. A ferrofluid seal for sealing a shaft, said seal comprised of:
a permanent magnet positioned about said shaft;
at least one pole piece attached to said magnet, said pole piece extending from said magnet to a position near said shaft to form a gap, said pole piece being comprised of a compound of an epoxy mixture and a powdered ferromagnetic material; and
ferrofluid in said gap.

9. A ferrofluid seal according to claim 8 wherein said powdered ferromagnetic material is chosen from the group consisting of iron, cobalt, nickel, iron-cobalt alloys, iron silicon alloys, iron-nickel alloys, iron-nickel-molybdenum alloys and iron oxide.

10. A ferrofluid seal according to claim 8 wherein said epoxy resin mixture comprises a mixture of epoxy resin and epoxy resin hardener.

11. A ferrofluid seal according to claim 8 wherein said pole piece compound is electrically conductive.

12. A ferrofluid seal according to claim 8 wherein said seal has a single pole piece.

13. A ferrofluid seal according to claim 8 wherein said seal has two pole pieces.

14. A ferrofluid seal according to claim 13 wherein said two pole pieces have different thicknesses.

15. A ferrofluid seal according to claim 8 wherein said pole piece has a tapered face to form a tapered gap between said pole piece and said shaft.

* * * * *